(12) United States Patent
Tanikawa et al.

(10) Patent No.: US 7,980,540 B2
(45) Date of Patent: Jul. 19, 2011

(54) STABILIZER FOR IN VIVO EXAMINATION

(75) Inventors: Yoshihisa Tanikawa, Tokyo (JP); Ryoji Hyodo, Hachioji (JP); Kayuri Muraki, Hachioji (JP)

(73) Assignee: Olympus Corporation, Tokyo (JP)

( * ) Notice: Subject to any disclaimer, the term of this patent is extended or adjusted under 35 U.S.C. 154(b) by 1131 days.

(21) Appl. No.: 11/730,074

(22) Filed: Mar. 29, 2007

(65) Prior Publication Data

US 2007/0236783 A1    Oct. 11, 2007

(30) Foreign Application Priority Data

Apr. 6, 2006  (JP) .................................. 2006-105593
Apr. 6, 2006  (JP) .................................. 2006-105594

(51) Int. Cl.
*B23Q 3/00*         (2006.01)
(52) U.S. Cl. .................. 269/909; 29/281.1; 359/368
(58) Field of Classification Search .................. 269/909, 269/900, 296, 309–310; 29/281.1; 359/368
See application file for complete search history.

(56) References Cited

U.S. PATENT DOCUMENTS

| | | | | |
|---|---|---|---|---|
| 5,730,433 A | * | 3/1998 | Veres | 269/41 |
| 5,906,034 A | * | 5/1999 | Weisshaar | 29/257 |
| 5,961,109 A | * | 10/1999 | Dykstra et al. | 269/228 |
| 6,402,130 B1 | * | 6/2002 | Price et al. | 269/91 |
| 6,877,400 B2 | * | 4/2005 | Weaver et al. | 81/53.1 |
| 2004/0125437 A1 | * | 7/2004 | Schmidt et al. | 359/368 |
| 2005/0094260 A1 | * | 5/2005 | Tokuda et al. | 359/368 |
| 2005/0280892 A1 | | 12/2005 | Nagasawa et al. | |
| 2007/0236783 A1 | * | 10/2007 | Tanikawa et al. | 359/368 |

FOREIGN PATENT DOCUMENTS

| | | |
|---|---|---|
| EP | 1524542 A1 | 4/2005 |
| JP | 2005-338631 | 12/2005 |
| WO | 0187398 A2 | 11/2001 |

OTHER PUBLICATIONS

Extended European Search Report for corresponding foreign application EP 007006285.6-2217, dated Aug. 21, 2007.

* cited by examiner

*Primary Examiner* — Lee D Wilson
(74) *Attorney, Agent, or Firm* — Pillsbury Winthrop Shaw Pittman, LLP

(57) ABSTRACT

Dynamic movement of a specimen in a pressing direction and in directions intersecting the pressing direction is effectively suppressed, while maintaining the viability of the specimen. A stabilizer for in vivo examination that is placed in contact with a biological specimen during examination of the specimen to suppress movement thereof includes a contact-area increasing portion that is provided on a contact surface with the biological specimen and that is configured to increase the contact area with the biological specimen by virtue of a pressure applied during the contact.

4 Claims, 14 Drawing Sheets

STABILIZER FOR IN VIVO EXAMINATION

CROSS REFERENCE TO RELATED APPLICATIONS

This application is based upon and claims the benefit of priority from Japanese Patent Application Nos. 2006-105593, filed Apr. 6, 2006 and 2006-105594, filed Apr. 6, 2006, the entire contents of which are incorporated herein by reference.

BACKGROUND OF THE INVENTION

1. Field of the Invention

The present invention relates to a stabilizer for in vivo examination that is in contact with a biological specimen to suppress movement of the biological specimen during examination of thereof.

2. Description of Related Art

A known stabilizer for in vivo examination is disclosed in, for example, Japanese Unexamined Patent Application, Publication No. 2005-338631.

This stabilizer for in vivo examination includes a tip having a round shape or a U shape. Dynamic movement of a specimen, such as pulsing, can be suppressed during examination by pressing the specimen with the tip or by applying negative pressure to a suction hole provided on the surface that contacts the specimen to suck the specimen by the resulting suction force. A microscope examination system including this stabilizer for in vivo examination is advantageous in that microscope examination can be performed while suppressing pulsing of the specimen, thereby providing sharp blur-free images.

However, since the stabilizer for in vivo examination disclosed in Japanese Unexamined Patent Application, Publication No. 2005-338631 merely presses a specimen or sucks the specimen by a suction force, the following problems occur. In a stabilizer that merely presses a specimen, although movement of the specimen in the pressing direction can be suppressed by increasing the pressure, this stabilizer suffers from the problem that it is difficult to effectively suppress movement of the specimen in directions intersecting the pressing direction. In a stabilizer that sucks a specimen by a suction force, movement of the specimen not only in the direction parallel to the sucking direction but also in directions intersecting the sucking direction can be suppressed by increasing the suction force. However, as the negative pressure applied to the suction hole is increased, the surface of the specimen at the suction hole is sucked inside the suction hole. Consequently, blood stasis may occur in the sucked part or the specimen may be damaged. In addition, when the specimen is sucked while the tip of the stabilizer is in contact with the surface of the specimen, and if the specimen bleeds, the blood is also sucked into the suction hole. In such a case, there is a problem in that the suction hole may become clogged with the blood while using the stabilizer.

BRIEF SUMMARY OF THE INVENTION

The present invention has been conceived in view of the above situation, and an object of the present invention is to provide a stabilizer for in vivo examination in which dynamic movement of a biological specimen in the pressing direction and in directions intersecting the pressing direction can be effectively suppressed, while maintaining the viability of the biological specimen. Another object of the present invention is to provide a stabilizer for in vivo examination in which dynamic movement of a specimen, such as pulsing, can be effectively suppressed by sucking, while maintaining the viability of the specimen. Another object of the present invention is to provide a stabilizer for in vivo examination in which entry of blood into a tube or a pump can be prevented, and even if blood or the like is sucked into a suction hole, it can be easily removed.

In order to realize the objects described above, the present invention provides the following solutions.

According to a first aspect of the present invention, a stabilizer for in vivo examination that is placed in contact with a biological specimen during examination of the specimen to suppress movement thereof includes a contact-area increasing portion that is provided on a contact surface with the biological specimen and that is configured to increase the contact area with the biological specimen by virtue of a pressure applied during the contact, compared with a case where the specimen is pressed with a surface orthogonal to an observation optical axis.

According to the first aspect of the present invention, when the contact surface of the stabilizer for in vivo examination is brought into contact with a biological specimen during examination of the biological specimen, the contact-area increasing portion is operated by the pressure applied during the contact to increase the contact area with the biological specimen on the contact surface. As a result, frictional forces generated between the biological specimen and the contact surface can be increased, thereby preventing shifting of the biological specimen in directions intersecting the observation optical axis. In this case, unlike the case where the biological specimen is sucked by a negative pressure, the shape of the biological specimen does not suddenly change and negative pressure is not applied to the specimen. Accordingly, for example, blood stasis of the biological specimen can be prevented, thus maintaining the viability of the specimen.

In the first aspect described above, the contact-area increasing portion may be disposed on the contact surface and may be an elastic member whose shape is changed by virtue of the pressure to conform to the shape of an outer surface of the biological specimen.

According to this structure, when the pressure is applied to the elastic member, the shape of the contact surface undergoes elastic deformation to conform to the shape of an outer surface of the biological specimen. As a result, the contact area between the contact surface of the stabilizer for in vivo examination and the biological specimen is increased, increasing frictional forces generated between the biological specimen and the contact surface, thereby preventing shifting of the biological specimen in directions intersecting the observation optical axis. In this case, unlike the case where the biological specimen is sucked by a negative pressure, the shape of the biological specimen does not suddenly change and negative pressure is not applied to the specimen. Accordingly, for example, blood stasis of the biological specimen can be prevented, thus maintaining the viability of the specimen.

Furthermore, when the elastic member is made of a material having a coefficient of friction larger than that of the other part of the contact surface of the stabilizer for in vivo examination, the frictional force can be further increased. As a result, shifting of the biological specimen in directions intersecting the observation optical axis can be prevented under a lower pressure. In this case, the load placed on the biological specimen can be further decreased, and such a stabilizer for in vivo examination can also be used for a soft biological specimen.

In the first aspect described above, the contact-area increasing portion may be disposed so as to project from the contact surface and may include a plurality of projections that locally dent an outer surface of the biological specimen by virtue of the pressure.

According to this structure, when the contact surface of the stabilizer for in vivo examination is brought into contact with a biological specimen during examination of the biological specimen, the plurality of projections provided on the contact surface press the biological specimen with a certain pressure during contact so as to locally dent the outer surface of the biological specimen. Accordingly, the contact area between the biological specimen and the contact surface is increased. As a result, frictional forces generated between the biological specimen and the contact surface can be increased, thereby preventing shifting of the biological specimen in directions intersecting the observation optical axis. In this case, unlike the case where the biological specimen is sucked by a negative pressure, the shape of the biological specimen does not suddenly change and negative pressure is not applied to the specimen. Accordingly, for example, blood stasis of the biological specimen can be prevented, thus maintaining the viability of the specimen.

In the first aspect described above, the contact-area increasing portion may include at least one recess provided on the contact surface, and an inner surface of the recess may have a shape tapering from the contact surface.

According to this structure, when the contact surface of the stabilizer for in vivo examination is brought into contact with a biological specimen during examination of the biological specimen, the biological specimen is made to protrude by a pressure applied during contact to enter at least one recess provided on the contact surface. Accordingly, the contact area between the biological specimen and the contact surface is increased. In this case, since an inner surface of the recess has a shape tapered away from the contact surface, the shape of the biological specimen is moderately changed along the inner surface of the recess. Accordingly, unlike the case where the biological specimen is sucked by a suction hole, the shape of the biological specimen does not suddenly change and negative pressure is not applied to the specimen. Accordingly, for example, blood stasis of the biological specimen can be prevented, thus maintaining the viability of the specimen. Examples of the tapered shape include a conical shape, a concave spherical shape, and a staircase shape.

According to a second aspect of the present invention, a stabilizer for in vivo examination that is placed in contact with a biological specimen during examination of the specimen to suppress movement thereof includes a contact portion that is provided around an observation area and that is configured to be brought into contact with the biological specimen, wherein a recess defining a small space, together with the surface of the biological specimen, is provided in the contact portion, a pressure-reducing device configured to reduce the pressure in the small space is connected to the recess, and a through-hole member having at least one through hole is provided in the recess.

According to the second aspect of the present invention, when the contact portion of the stabilizer is brought into contact with a biological specimen around an observation area during examination of the biological specimen, the opening of the recess provided on the contact portion is sealed off by the surface of the biological specimen to define a small space in the recess. The pressure in the small space is reduced by the operation of the pressure-reducing device connected to the small space. Accordingly, the surface of the biological specimen is sucked and attached to the contact portion. In this case, since the recess is filled with the through-hole member, the suction cross-sectional area is decreased, thereby preventing the surface of the biological specimen from being excessively sucked. Furthermore, since the through-hole member is disposed in the recess, the surface of the sucked biological specimen does not enter the recess, thereby preventing, for example, the generation of blood stasis caused by locally sucking the surface of the biological specimen.

In the second aspect described above, the through-hole member may be provided in the recess in such a manner so as to be replaceable.

When sucked blood or the like clogs in the through-hole member for decreasing the suction cross-sectional area, it is difficult to reuse the through-hole member. However, according to the present invention, the through-hole member in the recess can be easily replaced with a new one to easily recover the suction force. Furthermore, according to this structure, the amount of waste can be decreased by replacing only the through-hole member without disposing of the entire stabilizer for in vivo examination.

In the second aspect described above, the through-hole member may be composed of a porous material having a plurality of continuous pores.

According to this structure, the sucking positions of the biological specimen can be dispersed over the plurality of continuous pores so that the suction force does not locally act on the biological specimen. Accordingly, the suction force can be increased, while maintaining the viability of the biological specimen.

In the second aspect described above, the contact portion may have a ring shape having a central through hole, and the recess may be a ring-shaped groove provided so as to surround the central through hole of the contact portion around the entire circumference thereof.

According to this structure, the pressure in the ring-shaped groove around the central through hole is reduced and the periphery of the observation area of the biological specimen can be sucked around the entire circumference. Accordingly, dynamic movement of the observation area can be effectively suppressed.

The present invention affords an advantage in that dynamic movement of a biological specimen in a pressing direction and in directions intersecting the pressing direction can be effectively suppressed, while maintaining the viability of the biological specimen. The present invention affords an advantage in that dynamic movement of a biological specimen, such as pulsing, can be effectively suppressed by sucking, while maintaining the viability of the biological specimen.

The present invention also affords an advantage in that even if blood or the like is sucked into a suction hole, it can be easily removed.

BRIEF DESCRIPTION OF THE SEVERAL VIEWS OF THE DRAWINGS

FIG. 3A shows a state before the stabilizer for in vivo examination contacts a specimen, and FIG. 3B shows a state in which the stabilizer is in contact with the specimen.

FIG. 5A shows a state before the stabilizer for in vivo examination contacts a specimen, and FIG. 5B shows a state in which the stabilizer is in contact with the specimen.

FIG. 7A shows a state before the stabilizer for in vivo examination contacts a specimen, and FIG. 7B shows a state in which the stabilizer is in contact with the specimen.

DETAILED DESCRIPTION OF THE INVENTION

First Embodiment

A stabilizer for in vivo examination 1 according to a first embodiment of the present invention will now be described with reference to FIGS. 1, 2, 3A, and 3B.

Figure 1:
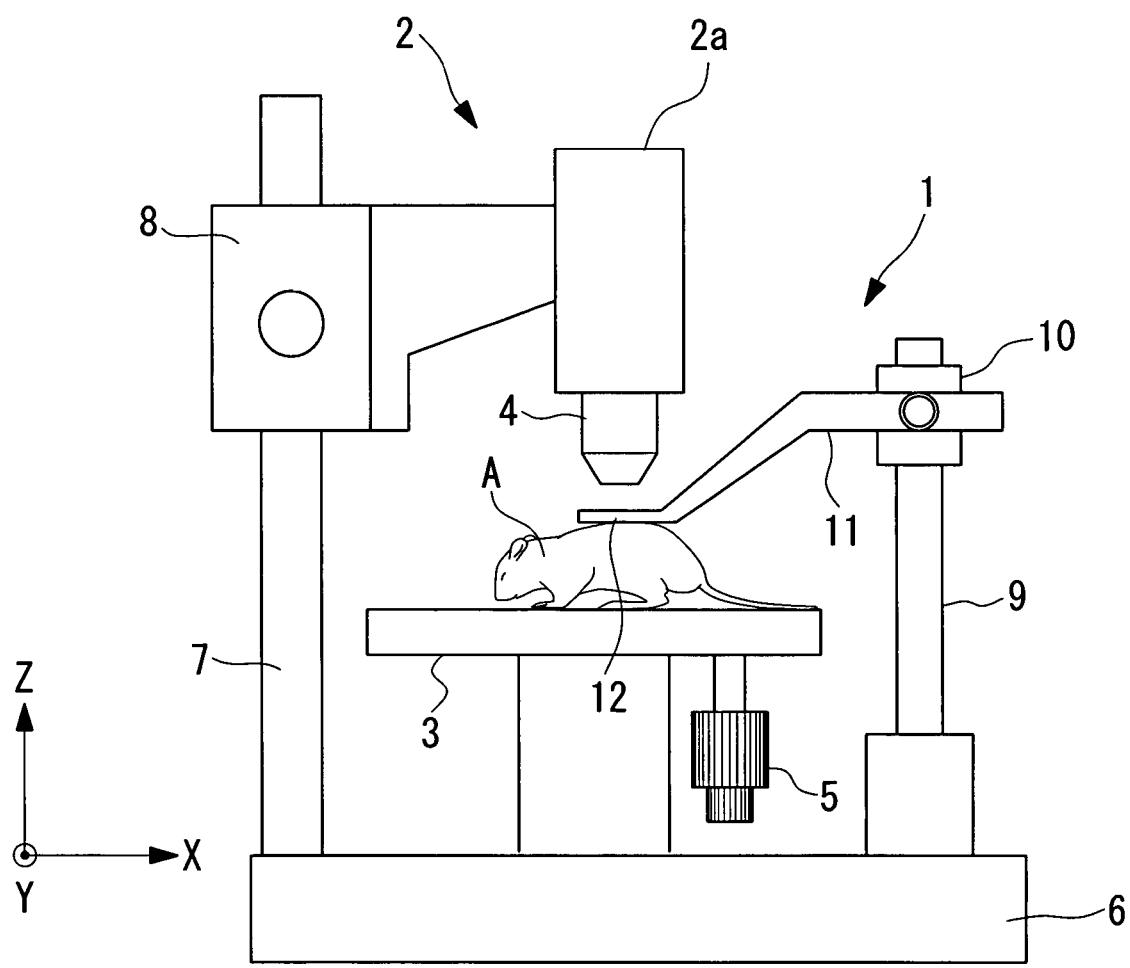
FIG. 1 is a view showing the overall structure of a microscope examination system including a stabilizer for in vivo examination according to a first embodiment of the present invention.

As shown in FIG. 1, the stabilizer for in vivo examination 1 of this embodiment is a unit disposed near a microscope examination unit 2. The microscope examination unit 2 includes a stage 3 on which a specimen (biological specimen) A is placed and an objective unit 4 that is disposed above the stage 3 so as to face the specimen A on the stage 3. Examples of the specimen A include biological tissue, such as cells and muscles, and organs, such as the heart and the liver, of mammals, e.g., small laboratory animals.

The stage 3 includes an adjusting dial 5. By operating the adjusting dial 5, the specimen A can be moved in two horizontal directions orthogonal to the optical axis of the objective unit 4, e.g., in the X direction and the Y direction.

The microscope examination unit 2 is attached to a supporting column 7, which extends from a base 6 in the vertical direction, with an elevating/lowering mechanism 8 so as to move in the vertical direction. By disposing the objective unit 4 so as to be oriented downward, the specimen A on the stage 3 can be examined. Furthermore, by operating the elevating/lowering mechanism 8, the objective unit 4 can be moved closer to or farther away from the specimen A, thereby adjusting the focus.

Figure 2:
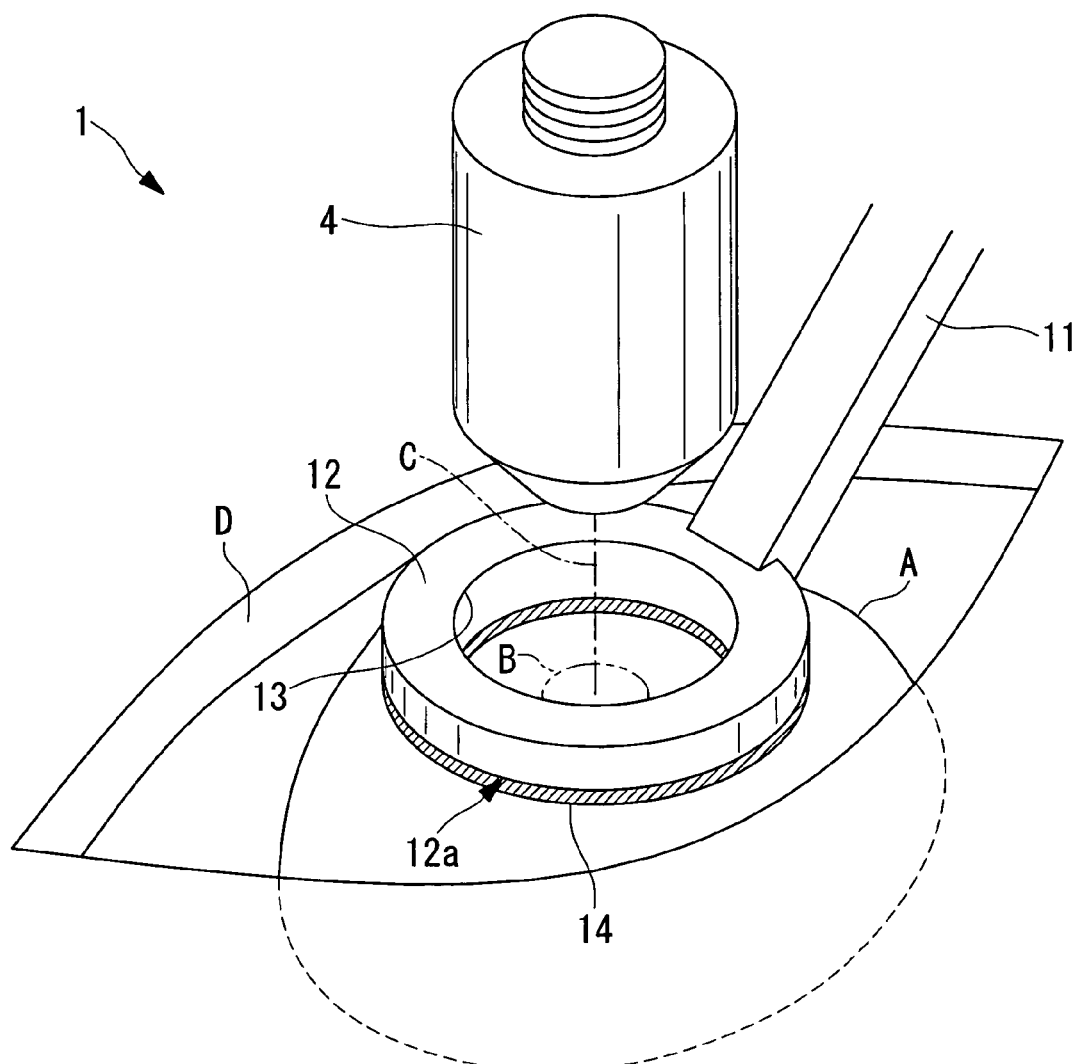
FIG. 2 is a perspective view showing the relationship between an objective unit and the stabilizer for in vivo examination in the microscope examination system shown in FIG. 1.
Figure 3A:
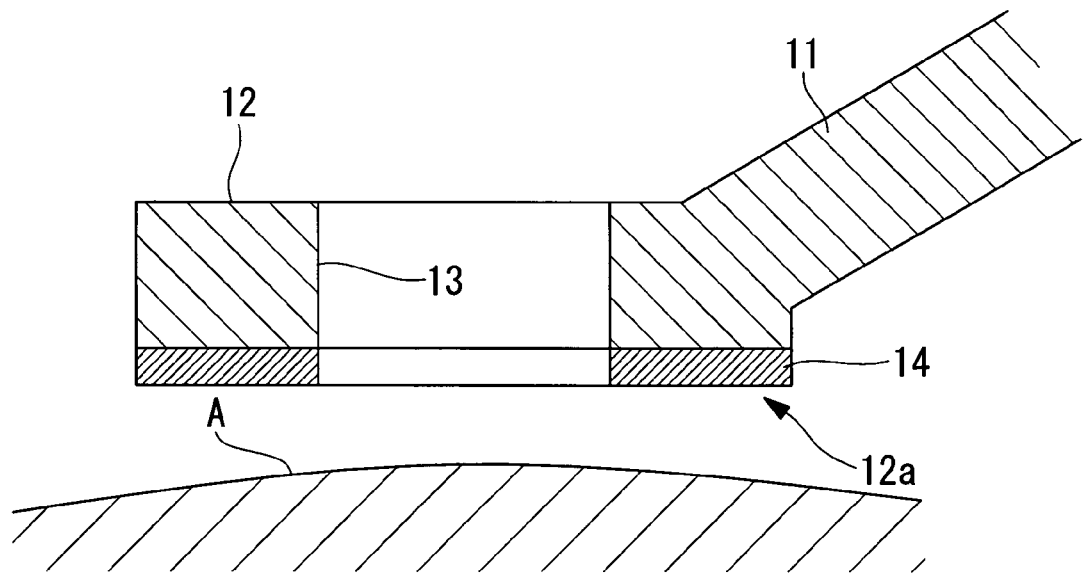
FIGS. 3A and 3B are schematic longitudinal cross-sectional views illustrating the operation of the stabilizer for in vivo examination shown in FIG. 1.
Figure 3B:
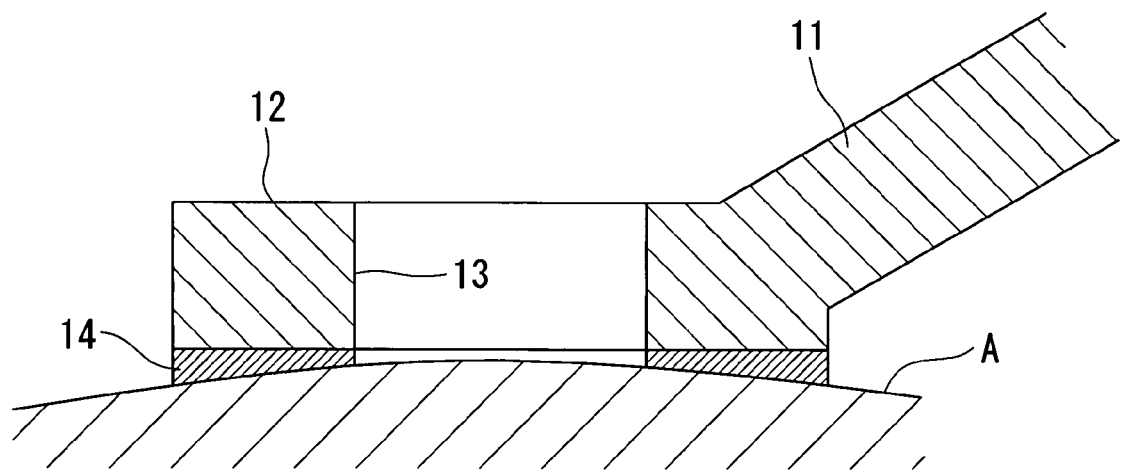

The stabilizer for in vivo examination 1 of this embodiment includes an arm 11 that is similarly attached to a supporting column 9, which extends from the base 6 in the vertical direction, with an elevating/lowering mechanism 10 so as to move in the vertical direction and a tip (contact portion) 12 disposed at the end of the arm 11. As shown in FIGS. 2, 3A, and 3B, the tip 12 has, for example, a ring shape in which a through hole (recess) 13 larger than an observation area B of the objective unit 4 is formed at the center thereof.

On the tip 12, a sheet member (elastic member) 14 made of an elastic material is bonded on a contact surface 12a that contacts the specimen A disposed under the tip 12. The sheet member 14 has a satisfactory flexibility. When the sheet member 14 is brought into contact with the specimen A and pressed, the sheet member 14 undergoes elastic deformation conforming to an outer surface shape of the specimen A. Preferred examples of the elastic material include biocompatible materials such as silicone rubbers and urethane rubbers. Furthermore, the elastic material preferably has a coefficient of friction higher than that of the tip 12.

The operation of the stabilizer for in vivo examination 1 of this embodiment having the above structure will now be described.

In examination of the specimen A with the microscope examination unit 2, first, an outer skin D of a small laboratory animal or the like is incised to expose the specimen A, such as an organ. The elevating/lowering mechanism 10 is operated to move the arm 11 and the tip 12 of the stabilizer for in vivo examination 1 downward, thus bringing the contact surface 12a of the tip 12 into contact with the top surface of the specimen A.

In this step, the arm 11 and the tip 12 are moved downward so that a predetermined pressure is applied to the contact surface 12a of the stabilizer for in vivo examination 1. Accordingly, the specimen A is sandwiched between the contact surface 12a of the tip 12 and the stage 3 to suppress dynamic movement due to pulsing or the like.

In this case, according to the stabilizer for in vivo examination 1 of this embodiment, the predetermined pressure acts on the contact surface 12a, whereby the sheet member 14 bonded on the contact surface 12a undergoes elastic deformation to conform to an outer surface shape of the specimen A. As a result, the area of the sheet member 14 that is in contact with the specimen A is increased. Furthermore, unlike the case where the specimen A is merely pressed with a surface orthogonal to the direction of an observation optical axis C, the contact surface 12a has a portion that is slanted with respect to the surface orthogonal to the observation optical axis C because the sheet member 14 is in close contact with the specimen A while undergoing elastic deformation. Consequently, opposing forces against forces applied from the specimen A and acting in the directions intersecting the observation optical axis C can be generated.

As a result, when the pressure is constant, frictional forces generated between the specimen A and the contact surface 12a of the stabilizer for in vivo examination 1 and acting in the directions intersecting the observation optical axis C are increased due to the increased contact area and the slanted portion formed on the contact surface 12a. Accordingly, the stabilizer for in vivo examination 1 of this embodiment is advantageous in that dynamic movement of the specimen A can be effectively suppressed not only in the direction parallel to the observation optical axis C but also in the directions intersecting the observation optical axis C.

Furthermore, an increase in the coefficient of friction due to the sheet member 14 can effectively suppress shifting of the specimen A in the directions intersecting the observation optical axis C.

As described above, according to the stabilizer for in vivo examination 1 of this embodiment, dynamic movement of the specimen A can be effectively suppressed not only in the direction parallel to the observation optical axis C but also in the directions intersecting the observation optical axis C. Accordingly, blurring can be prevented in images obtained by the microscope examination unit 2, thus allowing sharp images to be acquired.

Unlike a known method in which the specimen A is sucked by a strong suction force to suppress dynamic movement thereof, in the stabilizer for in vivo examination 1 of this embodiment, it is sufficient that the force locally applied to the specimen A be weak. Accordingly, the stabilizer for in vivo examination 1 of this embodiment is also advantageous in that the viability of the specimen A can be maintained without causing problems such as blood stasis or damage of the specimen A.

Furthermore, since the pressure applied to the specimen A can be decreased by increasing the coefficient of friction, this stabilizer for in vivo examination 1 can also be used for a soft specimen.

In the description of this embodiment, the stabilizer for in vivo examination 1 is attached to the supporting column 9 provided near the microscope examination unit 2, but the position of the stabilizer for in vivo examination 1 is not limited to this. In either the case where the stabilizer for in vivo examination 1 is attached to a main unit 2a of the microscope examination unit 2 or the case where the stabilizer for in vivo examination 1 is attached to the objective unit 4 of the microscope examination unit 2, the same advantages can be achieved.

The tip 12 of the stabilizer for in vivo examination 1 may be made of any material, but is preferably made of a transparent material. In such a case, the state of the specimen A pressed by the tip 12 can be examined through the tip 12. For example, bleeding in the specimen A can be detected early, allowing the problem to be dealt with.

In the stabilizer for in vivo examination 1 of this embodiment, the ring-shaped tip 12 has been described as an example. Alternatively, the tip 12 may substantially have a U shape composed of two finger parts forking from the arm 11. However, the ring shape is preferred from the standpoint that the above advantages can be achieved around the entire circumference of the optical axis C.

Furthermore, when contamination from different specimens should be avoided, the stabilizer for in vivo examination 1 can be easily cleaned or sterilized because of its simple structure.

Second Embodiment

A stabilizer for in vivo examination 20 according to a second embodiment of the present invention will now be described with reference to FIGS. 4, 5A, and 5B.

In the description of this embodiment, components the same as those of the above-described stabilizer for in vivo examination 1 of the first embodiment are assigned the same reference numerals, and a description of the common structure is omitted.

Figure 4:
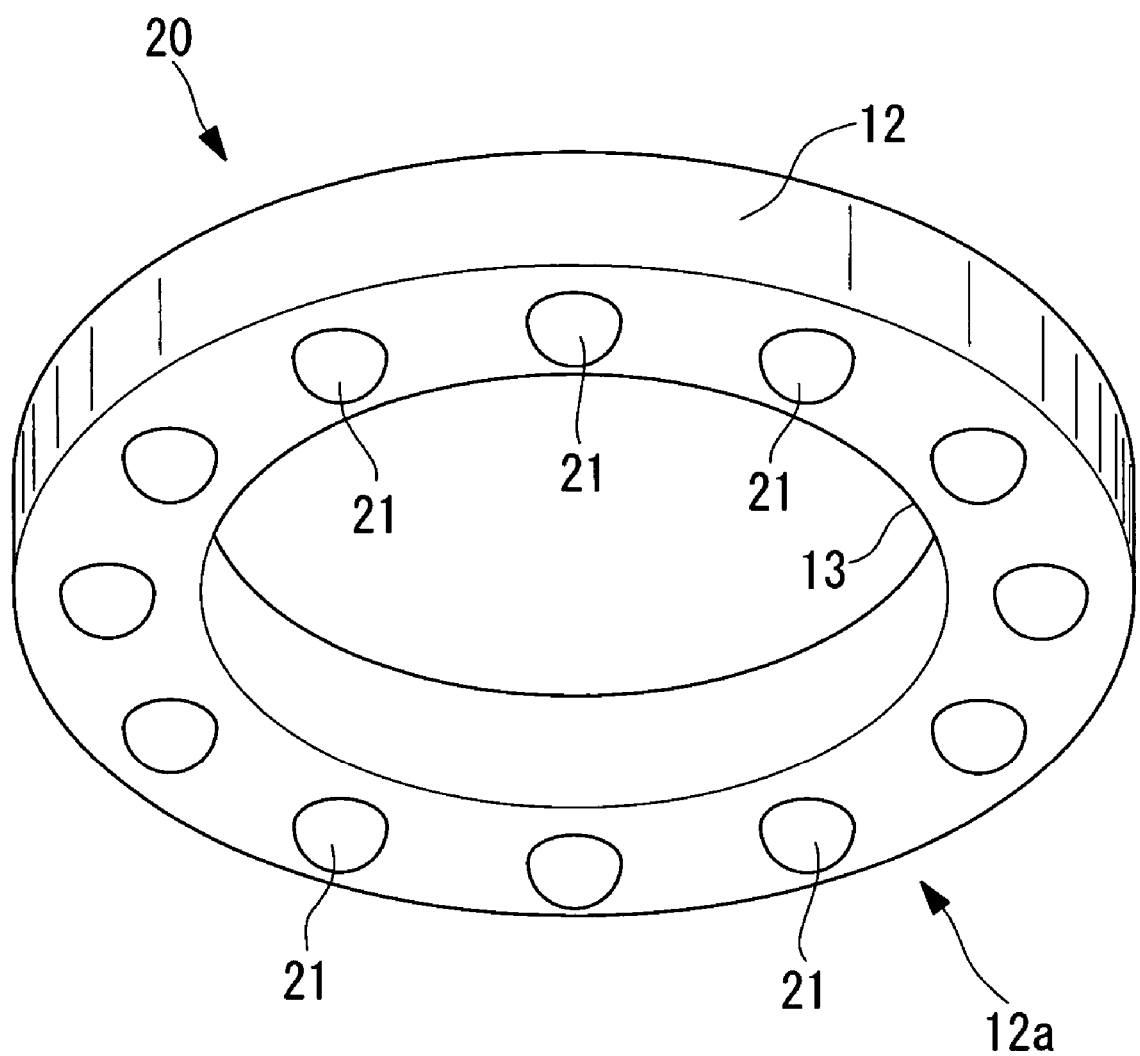
FIG. 4 is a perspective view showing the shape of the tip of a stabilizer for in vivo examination according to a second embodiment of the present invention.

As shown in FIG. 4, the stabilizer for in vivo examination 20 of this embodiment differs from the stabilizer for in vivo examination 1 of the first embodiment in the shape of the tip 12. FIG. 4 shows the lower surface of the tip 12.

In the stabilizer for in vivo examination 20 of this embodiment, the tip 12 has a ring shape and a plurality of projections 21 are provided on the surface that contacts a specimen A in the circumferential direction at predetermined intervals.

Each of the projections 21 has a hemispherical shape.

Figure 5A:
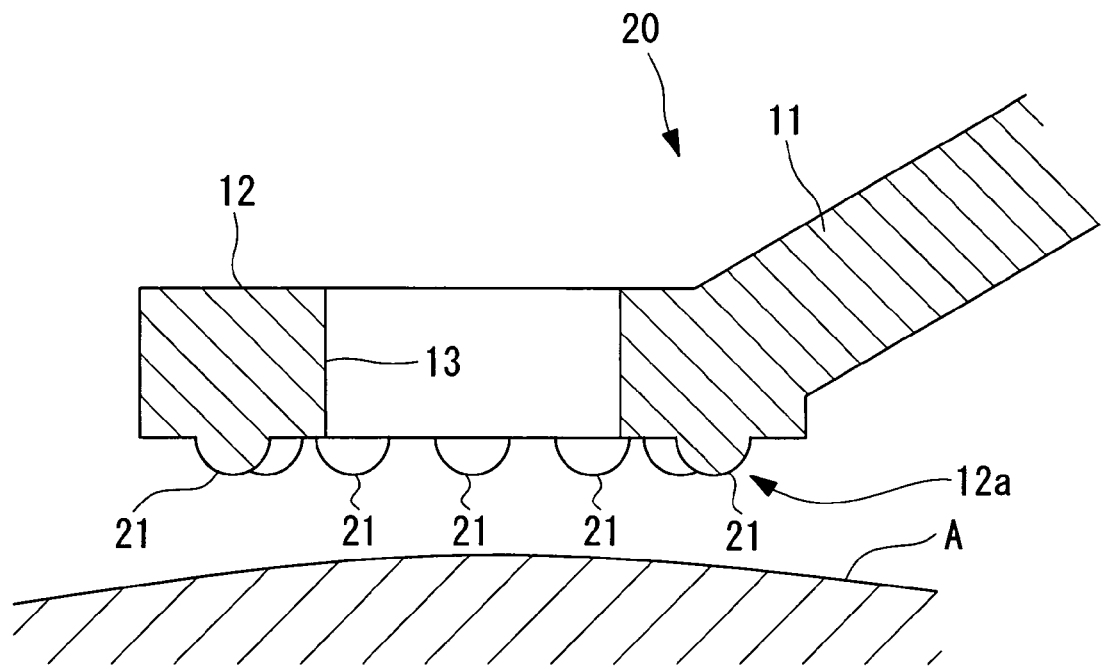
FIGS. 5A and 5B are schematic longitudinal cross-sectional views illustrating the operation of the stabilizer for in vivo examination shown in FIG. 4.
Figure 5B:
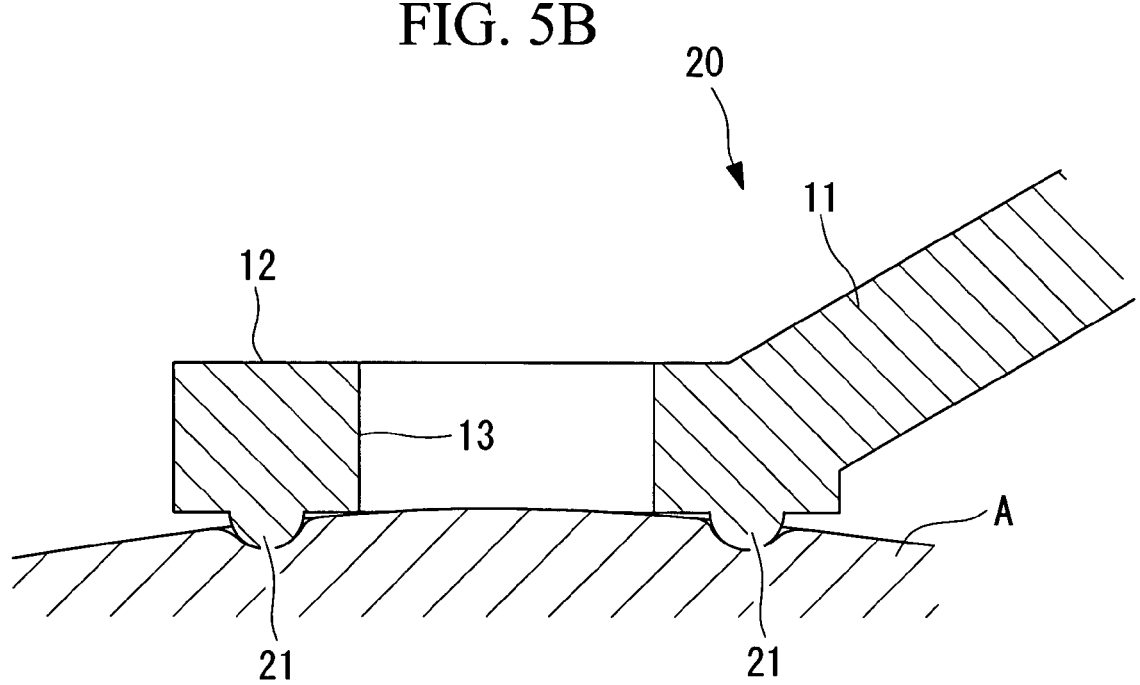

According to the stabilizer for in vivo examination 20 of this embodiment, as shown in FIGS. 5A and 5B, the elevating/lowering mechanism 10 is operated to move the arm 11 and the tip 12 of the stabilizer for in vivo examination 20 downward, thus bringing the contact surface 12a of the tip 12 into contact with the top surface of the specimen A.

In this step, the arm 11 and the tip 12 are moved downward so that a predetermined pressure is applied to the contact surface 12a of the stabilizer for in vivo examination 20. Accordingly, the specimen A is sandwiched between the contact surface 12a of the tip 12 and the stage 3 to suppress dynamic movement due to pulsing or the like.

In this case, according to the stabilizer for in vivo examination 20 of this embodiment, the predetermined pressure acts on the contact surface 12a, whereby the plurality of projections 21 provided on the contact surface 12a locally dent the specimen A with the pressure.

As a result, the outer surface of the dented specimen A is in close contact with the contact surface 12a of the tip 12, thereby increasing the contact area between the contact surface 12a and the specimen A. In addition, since the deformed specimen A is in close contact with the projections 21, unlike the case where the specimen A is merely pressed with a surface orthogonal to the direction of the observation optical axis C, opposing forces against forces applied from the specimen A and acting in the directions intersecting the observation optical axis C can be generated by portions of the projections 21 that are slanted with respect to the surface orthogonal to the observation optical axis C.

The projections 21 may be composed of members having a coefficient of friction larger than that of the contact surface 12a. Alternatively, the surfaces of the projections 21 may be coated or subjected to surface treatment for increasing the coefficient of friction.

As a result, when the pressure is constant, frictional forces generated between the specimen A and the contact surface 12a of the stabilizer for in vivo examination 20 and acting in the directions intersecting the observation optical axis C are increased due to the increased contact area and the slanted portions formed on the contact surface 12a. Accordingly, as in the first embodiment, the stabilizer for in vivo examination 20 of this embodiment is also advantageous in that dynamic movement of the specimen A can be effectively suppressed not only in the direction parallel to the observation optical axis C but also in the directions intersecting the observation optical axis C.

As described above, according to the stabilizer for in vivo examination 20 of this embodiment, dynamic movement of the specimen A can be effectively suppressed not only in the direction parallel to the observation optical axis C but also in the directions intersecting the observation optical axis C.

Accordingly, blurring can be prevented in images obtained by the microscope examination unit 2, thus allowing sharp images to be acquired.

Unlike the known method in which the specimen A is sucked by a strong suction force to suppress dynamic movement thereof, in the stabilizer for in vivo examination 20 of this embodiment, it is sufficient that the force locally applied to the specimen A be weak. Accordingly, the stabilizer for in vivo examination 20 of this embodiment is also advantageous in that the viability of the specimen A can be maintained without causing problems such as blood stasis or damage of the specimen A.

Furthermore, when contamination from different specimens should be avoided, the stabilizer for in vivo examination 20 can be easily cleaned or sterilized because of its simple structure.

Third Embodiment

A stabilizer for in vivo examination 30 according to a third embodiment of the present invention will now be described with reference to FIGS. 6, 7A, and 7B.

In the description of this embodiment, components the same as those of the first embodiment are assigned the same reference numerals, and a description of the common structure is omitted.

The stabilizer for in vivo examination 30 of this embodiment differs from the stabilizer for in vivo examination 1 of the first embodiment in the shape of the tip 12.

Figure 6:
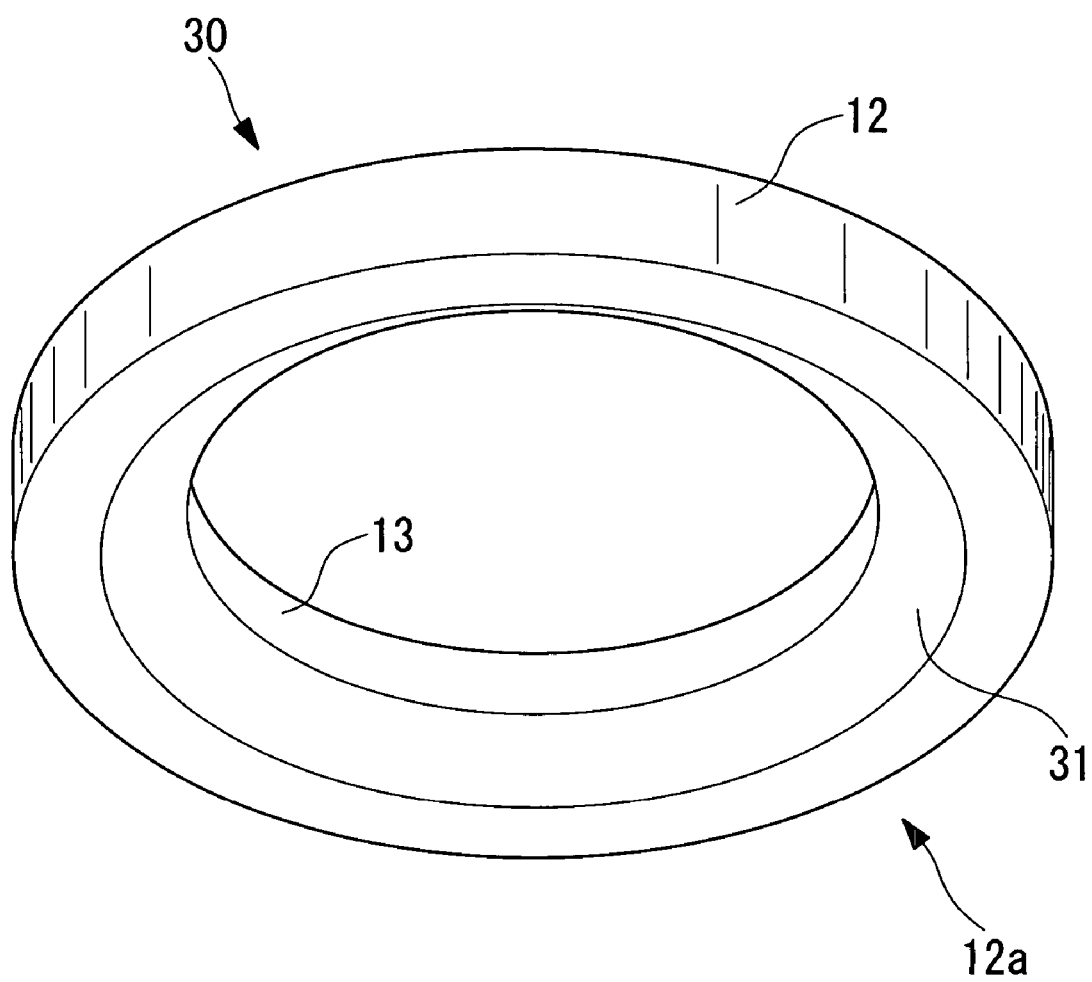
FIG. 6 is a perspective view showing the shape of the tip of a stabilizer for in vivo examination according to a third embodiment of the present invention.

As shown in FIG. 6, the tip 12 of this embodiment includes a tapered face 31 formed so as to chamfer an inner surface of the through hole 13 at the contact surface 12a side of the tip 12. The tapered face 31 is composed of a conical inner surface that is formed so that the diameter is gradually decreased from the lower surface side of the tip 12 along the central axis direction.

The tapered face 31 may be coated or subjected to surface treatment for increasing the coefficient of friction.

Figure 7A:
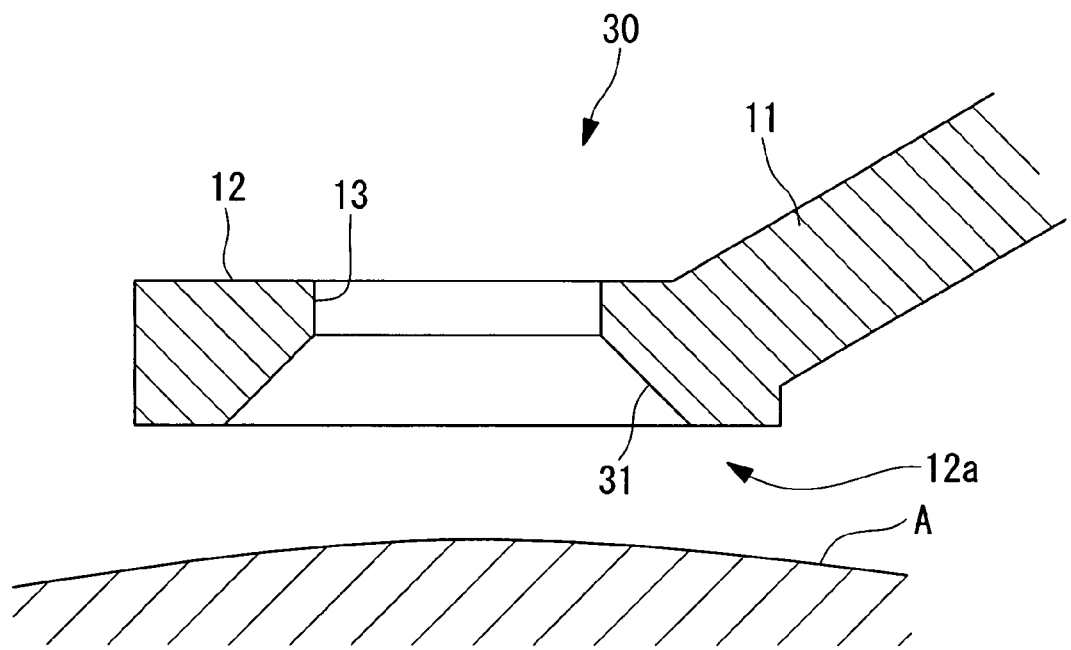
FIGS. 7A and 7B are schematic longitudinal cross-sectional views illustrating the operation of the stabilizer for in vivo examination shown in FIG. 6.
Figure 7B:
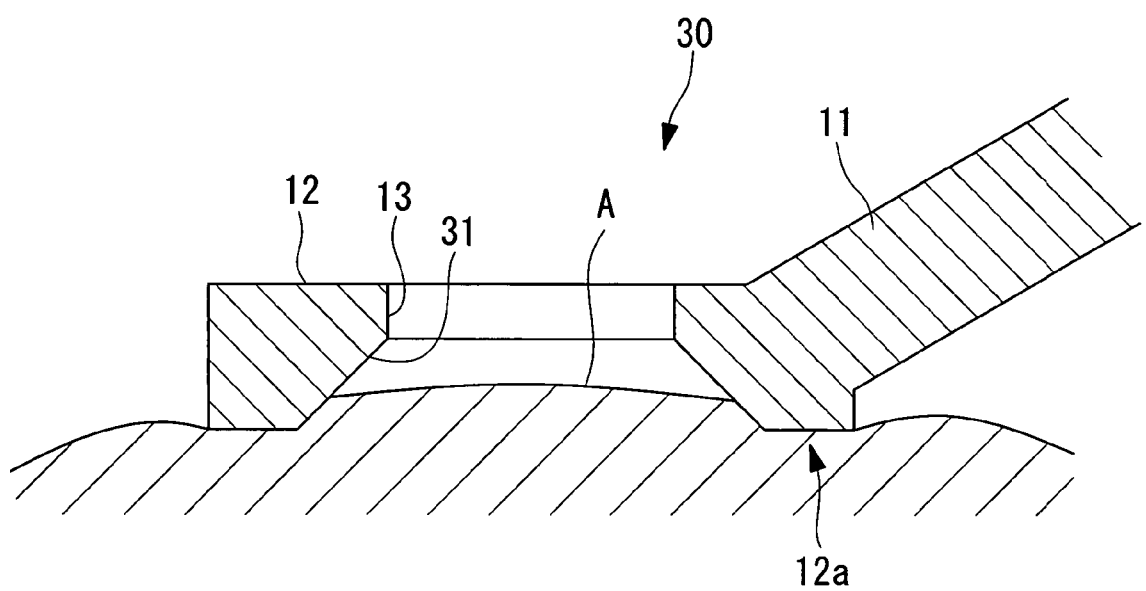

According to the stabilizer for in vivo examination 30 of this embodiment having the above structure, as shown in FIGS. 7A and 7B, when the contact surface 12a of the tip 12 is brought into contact with the specimen A, the shape of the specimen A is changed by the pressure and also comes into contact with the tapered face 31. Accordingly, the contact area is increased. In addition, since the deformed specimen A is in contact with the tapered face 31, unlike the case where the specimen A is merely pressed with a surface orthogonal to the direction of the observation optical axis C, opposing forces against forces applied from the specimen A and acting in the directions intersecting the observation optical axis C can be generated by the tapered face 31.

As a result, when the pressure is constant, frictional forces generated between the specimen A and the contact surface 12a of the stabilizer for in vivo examination 30 and acting in the directions intersecting the observation optical axis C are increased due to the increased contact area and the tapered face 31. Accordingly, as in the first embodiment, the stabilizer for in vivo examination 30 of this embodiment is advantageous in that dynamic movement of the specimen A can be effectively suppressed not only in the direction parallel to the observation optical axis C but also in the directions intersecting the observation optical axis C.

As described above, according to the stabilizer for in vivo examination 30 of this embodiment, dynamic movement of the specimen A can be effectively suppressed not only in the direction parallel to the observation optical axis C but also in the directions intersecting the observation optical axis C.

Accordingly, blurring can be prevented in images obtained by the microscope examination unit 2, thus allowing sharp images to be acquired.

Unlike the known method in which the specimen A is sucked by a strong suction force to suppress dynamic movement thereof, in the stabilizer for in vivo examination 30 of this embodiment, it is sufficient that the force locally applied to the specimen A be weak because the shape of the specimen A is simply and moderately changed to conform to the tapered face 31. Accordingly, the stabilizer for in vivo examination 30 of this embodiment is also advantageous in that the viability of the specimen A can be maintained without causing problems such as blood stasis or damage of the specimen A.

Furthermore, when contamination from different specimens should be avoided, the stabilizer for in vivo examination 30 can be easily cleaned or sterilized because of its simple structure.

Figure 8:
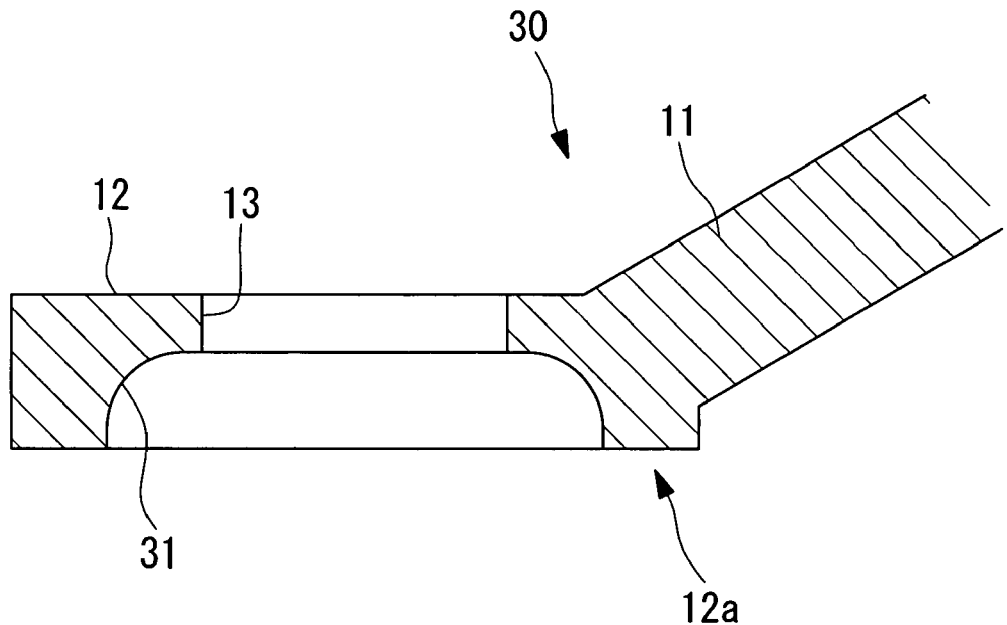
FIG. 8 is a longitudinal cross-sectional view showing a modification of the stabilizer for in vivo examination shown in FIG. 6.
Figure 9:
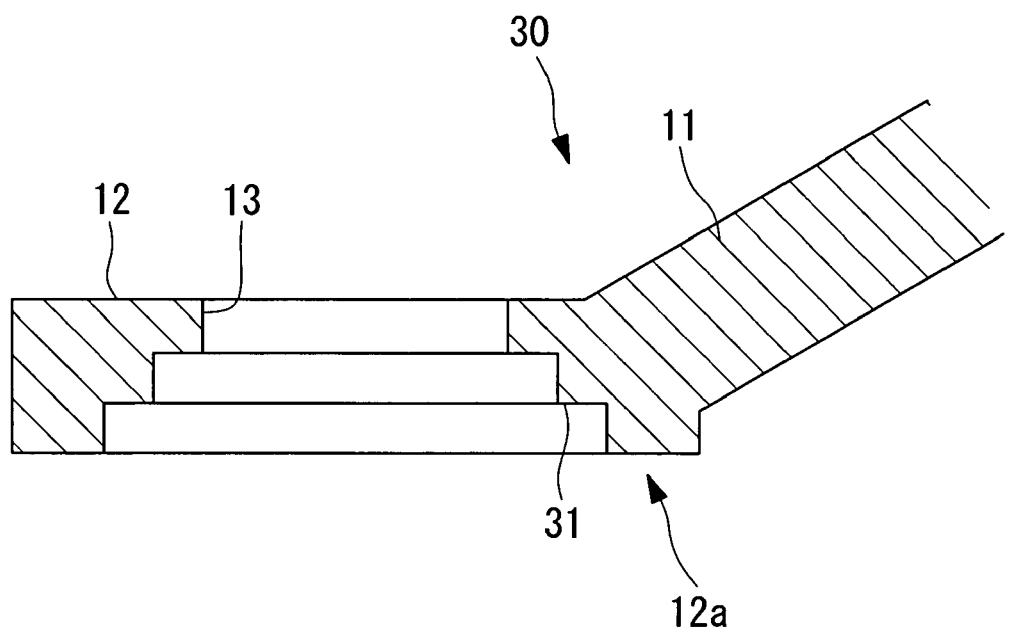
FIG. 9 is a longitudinal cross-sectional view showing another modification of the stabilizer for in vivo examination shown in FIG. 6.

In this embodiment, the tapered face 31 is formed as an inner surface of the through hole 13 at the center of the tip 12. Alternatively, a plurality of recesses may be provided in the tip 12, and the tapered face 31 may be provided in each of the recesses. In this embodiment, the tapered face 31 is formed so as to have a conical inner surface. Alternatively, as shown in FIG. 8, the tapered face 31 may be formed so as to substantially have a spherical inner surface. Alternatively, as shown in FIG. 9, the tapered face 31 may be formed so as to have a staircase shape.

Fourth Embodiment

A stabilizer for in vivo examination 101 according to a fourth embodiment of the present invention will now be described with reference to FIGS. 10 to 13.

Figure 10:
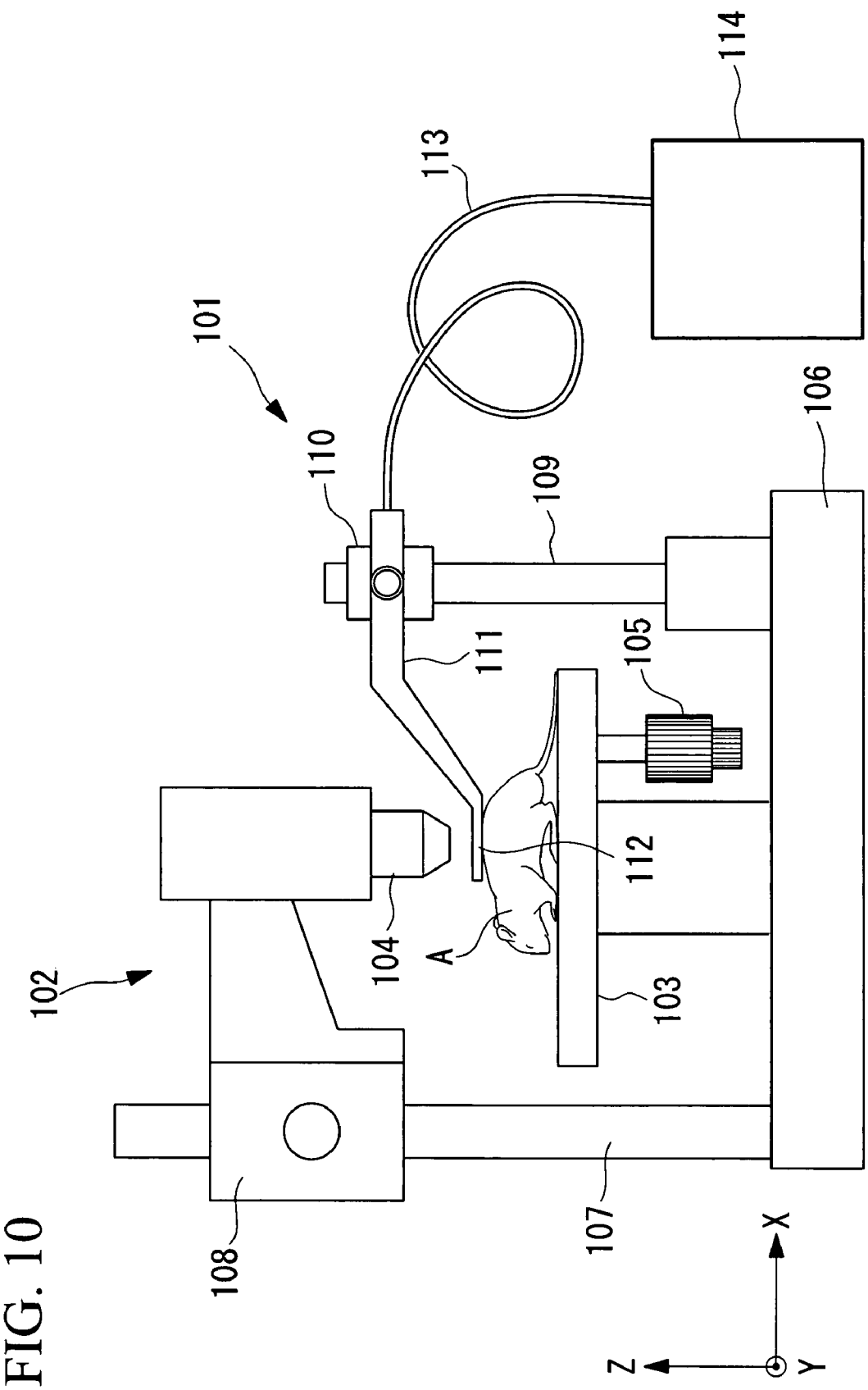
FIG. 10 is a view showing the overall structure of a microscope examination system including a stabilizer for in vivo examination according to a fourth embodiment of the present invention.

As shown in FIG. 10, the stabilizer for in vivo examination 101 of this embodiment is a unit disposed near a microscope examination unit 102. The microscope examination unit 102 includes a stage 103 on which a specimen (biological specimen) A is placed and an objective unit 104 that is disposed above the stage 103 so as to face the specimen A on the stage 103. Examples of the specimen A include biological tissue, such as cells and muscles, and organs, such as the heart and the liver, of mammals, e.g., small laboratory animals.

The stage 103 includes an adjusting dial 105. By operating the adjusting dial 105, the specimen A can be moved in two horizontal directions, e.g., in the X direction and the Y direction, orthogonal to the optical axis of the objective unit 104.

The microscope examination unit 102 is attached to a supporting column 107, which extends from a base 106 in the vertical direction, with an elevating/lowering mechanism 108 so as to move in the vertical direction. By disposing the objective unit 104 so as to be oriented downward, the specimen A on the stage 103 can be examined. Furthermore, by moving the elevating/lowering mechanism 108, the objective unit 104 can be moved closer to or farther away from the specimen A, thereby adjusting the focus.

Figure 11:
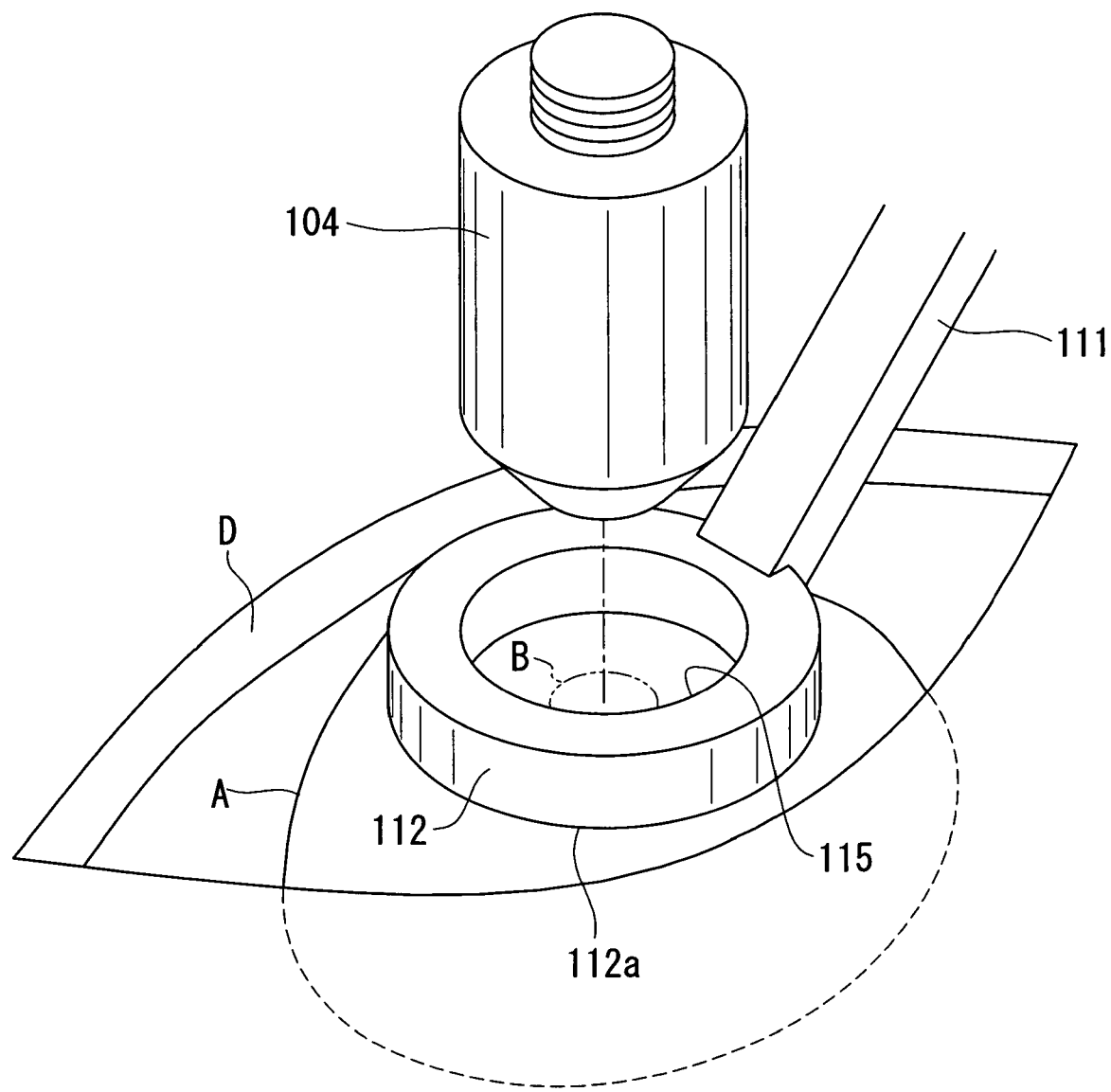
FIG. 11 is a perspective view showing the relationship between an objective unit and the stabilizer for in vivo examination in the microscope examination system shown in FIG. 10.

The stabilizer for in vivo examination 101 of this embodiment includes an arm 111 that is similarly attached to a supporting column 109, extending from the base 106 in the vertical direction, with an elevating/lowering mechanism 110 so as to move in the vertical direction; a tip 112 disposed at the end of the arm 111; and a suction pump (pressure-reducing device) 114 that sucks air via a tube 113 connected to the arm 111. As shown in FIG. 11, the tip 112 has, for example, a ring shape in which a through hole 115 larger than an observation area B of the objective unit 104 is formed at the center thereof.

Figure 12:
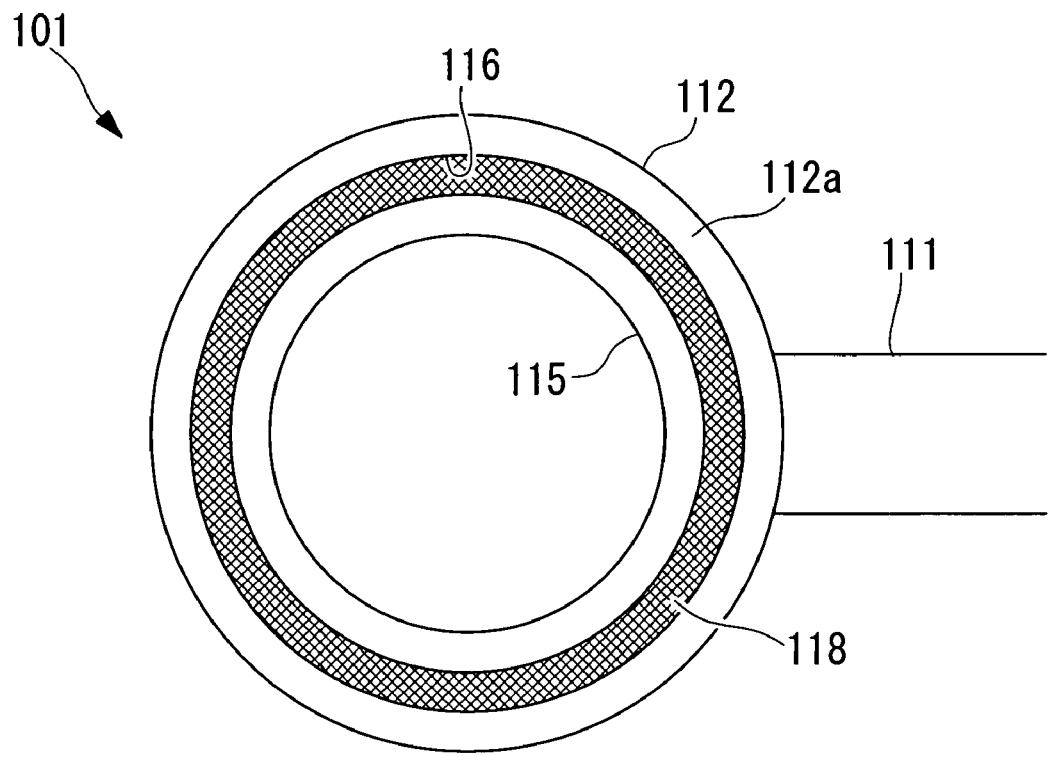
FIG. 12 is an enlarged partial bottom plan view showing the lower surface of the tip of the stabilizer for in vivo examination shown in FIG. 10.
Figure 13:
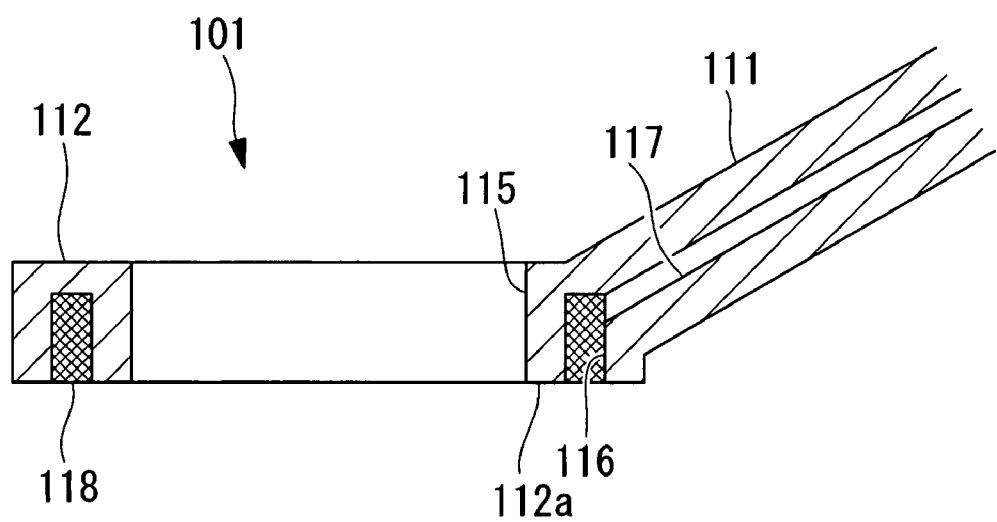
FIG. 13 is an enlarged partial longitudinal cross-sectional view showing the tip of the stabilizer for in vivo examination shown in FIG. 10.

As shown in FIG. 12, in the tip 112, a ring-shaped recess 116 formed in the circumferential direction so as to surround the through hole 115 is provided on a contact surface 112*a* to be brought into contact with the specimen A. As shown in FIG. 13, the arm 111 has a hollow structure, and a suction hole 117 connected to the tube 113 is provided in the arm 111. The suction hole 117 is connected to the recess 116.

A through-hole member 118 made of a porous material having a large number of continuous pores, e.g., a rigid sponge, fills the recess 116 in such a manner that it can be replaced with a new one. When the tip 112 is brought into close contact with the surface of the specimen A, the opening of the recess 116 is sealed off by the surface of the specimen A to form a small enclosed space. When the suction pump 114 is operated, the pressure in the small space in the recess 116 is reduced via the tube 113 and the suction hole 117.

The operation of the stabilizer for in vivo examination 101 of this embodiment having the above structure will now be described.

In order to perform microscope examination of a specimen using the stabilizer for in vivo examination 101 of this embodiment, first, as shown in FIG. 11, an outer skin D of a small laboratory animal or the like is incised to expose the specimen A, such as an organ. The elevating/lowering mechanism 110 is operated to move the arm 111 of the stabilizer for in vivo examination 101 downward, thus bringing the tip 112 into contact with the surface of the specimen A. Accordingly, the entire opening of the recess 116 provided on the tip 112 is sealed off by the surface of the specimen A to form a small enclosed space in the recess 116.

Subsequently, the suction pump 114 is operated to reduce the pressure in the small space defined by the recess 116 and the surface of the specimen A via the tube 113 and the suction hole 117 in the arm 111. Accordingly, the surface of the specimen A sealing off the opening of the recess 116 is sucked via the continuous pores of the through-hole member 118 filling the recess 116. Thus, the specimen A is sucked onto the contact surface 112*a* of the tip 112. In this state, the objective unit 104 of the microscope examination unit 102 is moved closer to an observation area B disposed in the through hole 115 of the tip 112, thereby adjusting the focus. Examination is then performed with the microscope examination unit 102.

According to the stabilizer for in vivo examination 101 of this embodiment, since the pressure in the recess 116 provided on the tip 112 is reduced to suck the surface of the specimen A, dynamic movement of the specimen A can be suppressed. In this case, the top surface of the specimen A is immobilized by sucking the specimen A at the position of the contact surface 112*a* of the tip 112, whereby dynamic movement of the specimen A can be suppressed in the direction (the Z direction) parallel to the observation optical axis of the objective unit 104. Furthermore, by sucking the specimen A, dynamic movement of the specimen A can also be suppressed in the directions intersecting the observation optical axis of the objective unit 104 (the X direction and the Y direction).

In addition, since the recess 116 is provided so as to have a ring shape surrounding the through hole 115, the periphery of the observation area B can be uniformly sucked around the entire circumference, thus effectively suppressing the dynamic movement of the specimen A. Consequently, sharp blur-free images can be obtained with the microscope examination unit 102.

According to the stabilizer for in vivo examination 101 of this embodiment, the recess 116 is filled with the through-hole member 118, thereby reducing the suction cross-sectional area. As a result, the suction force is decreased. Since the size of the continuous pores provided in the through-hole member 118 is sufficiently smaller than the size of the opening of the recess 116, the surface of the specimen A sucked in the recess 116 does not enter the continuous pores. Accordingly, problems such as blood stasis caused by locally sucking the surface of the specimen A can be prevented.

Since a spongy member having a large number of continuous pores is used as the through-hole member 118, a plurality of continuous pores are disposed so as to be distributed over the entire opening of the recess 116, thereby dispersing the suction positions of the specimen A. This structure further disperses the suction force, thus reducing the load placed on the specimen A. Accordingly, dynamic movement of the specimen A, such as pulsing, can be effectively suppressed, while maintaining the viability of the specimen A.

Furthermore, the through-hole member 118 fills in the recess 116 in such a manner that it can be replaced with a new one. Therefore, the through-hole member 118 can be removed after examination and then replaced with a new one. During sucking of the specimen A, blood or the like contained in the specimen A may be sucked out and clog the continuous pores of the through-hole member 118. In such a case, by replacing the through-hole member 118 with a new one after examination, the suction force can be easily recovered. When different types of specimen A are examined, the tip 112 must be cleaned or sterilized. The cleaning or sterilization of the tip 112 can be easily performed by removing the through-hole member 118 from the recess 116. Furthermore, since blood or the like is adsorbed by the through-hole member 118, the possibility of blood being sucked inside the tube 113 can be reduced. Accordingly, the work involved in, for example, cleaning and sterilization of the tube 113 can be reduced. A film having air-permeability and waterproofing properties may be provided at a part connecting the tube 113 to the tip 112.

In this embodiment, a spongy member having a large number of continuous pores is used as the through-hole member 118 filling in the recess 116, but the through-hole member 118 is not limited thereto. A member made of any material, for example, a metal or ceramic sintered compact, or a cloth such as gauze or a non-woven fabric, may also be used.

Figure 14:
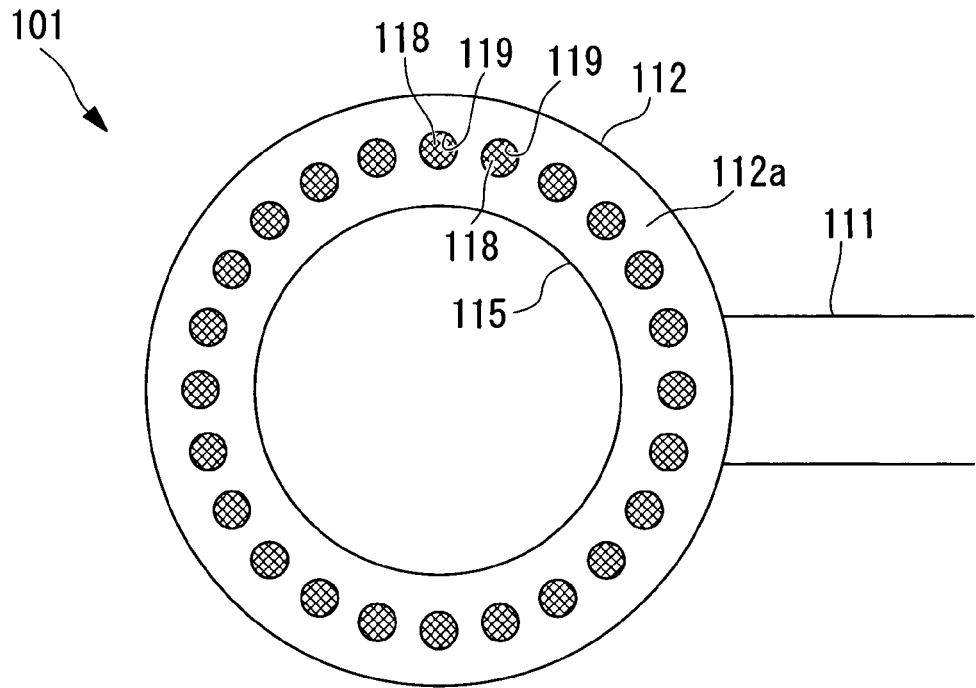
FIG. 14 is a bottom plan view showing a first modification of the tip of the stabilizer for in vivo examination shown in FIG. 10.

In this embodiment, the recess 116 provided on the tip 112 has a ring shape surrounding the central through hole 115. Alternatively, as shown in FIG. 14, a plurality of small holes (recesses) 119 may be arrayed in the circumferential direction at predetermined intervals so as to surround the through hole 115. All these small holes 119 are joined to be connected to the suction hole 117 in the arm 111. According to this structure, the pressure in all the small holes 119 can be uniformly reduced so that the periphery of an observation area B' can be sucked around the entire circumference.

Figure 15:
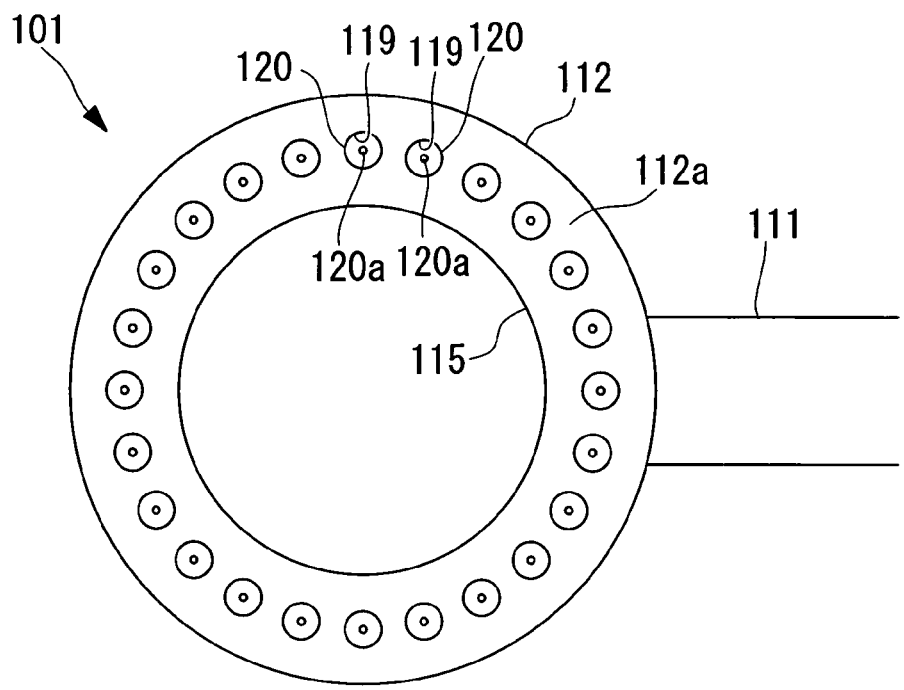
FIG. 15 is a bottom plan view showing a second modification of the tip of the stabilizer for in vivo examination shown in FIG. 10.
Figure 16:
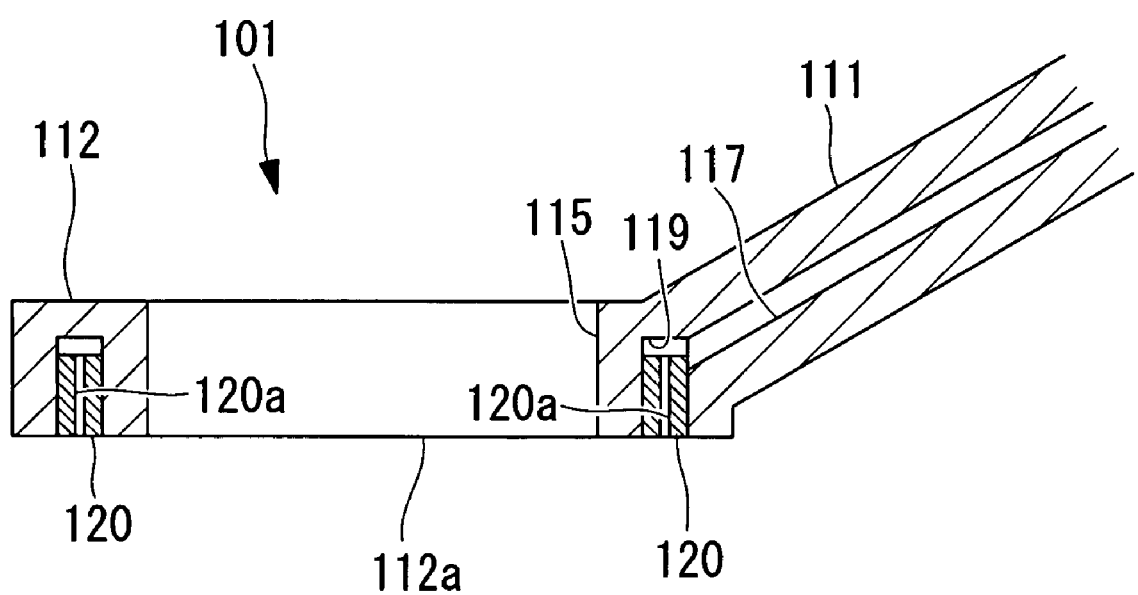
FIG. 16 is a partial longitudinal cross-sectional view showing the tip of the stabilizer for in vivo examination shown in FIG. 15.

Instead of the through-hole member 118 having a large number of continuous pores, as shown in FIGS. 15 and 16, a through-hole member 120 having at least one small hole 120*a* may be inserted in each recess 119, which has a small hole shape.

In this embodiment, the ring-shaped tip 112 having the through hole 115 at the center is described as an example. Alternatively, a tip 112 having a U shape or any other shape may also be used. However, the tip 112 having a ring-shaped recess is effective from the standpoint that a specimen can be sucked around the entire circumference of the optical axis.

Figure 17:
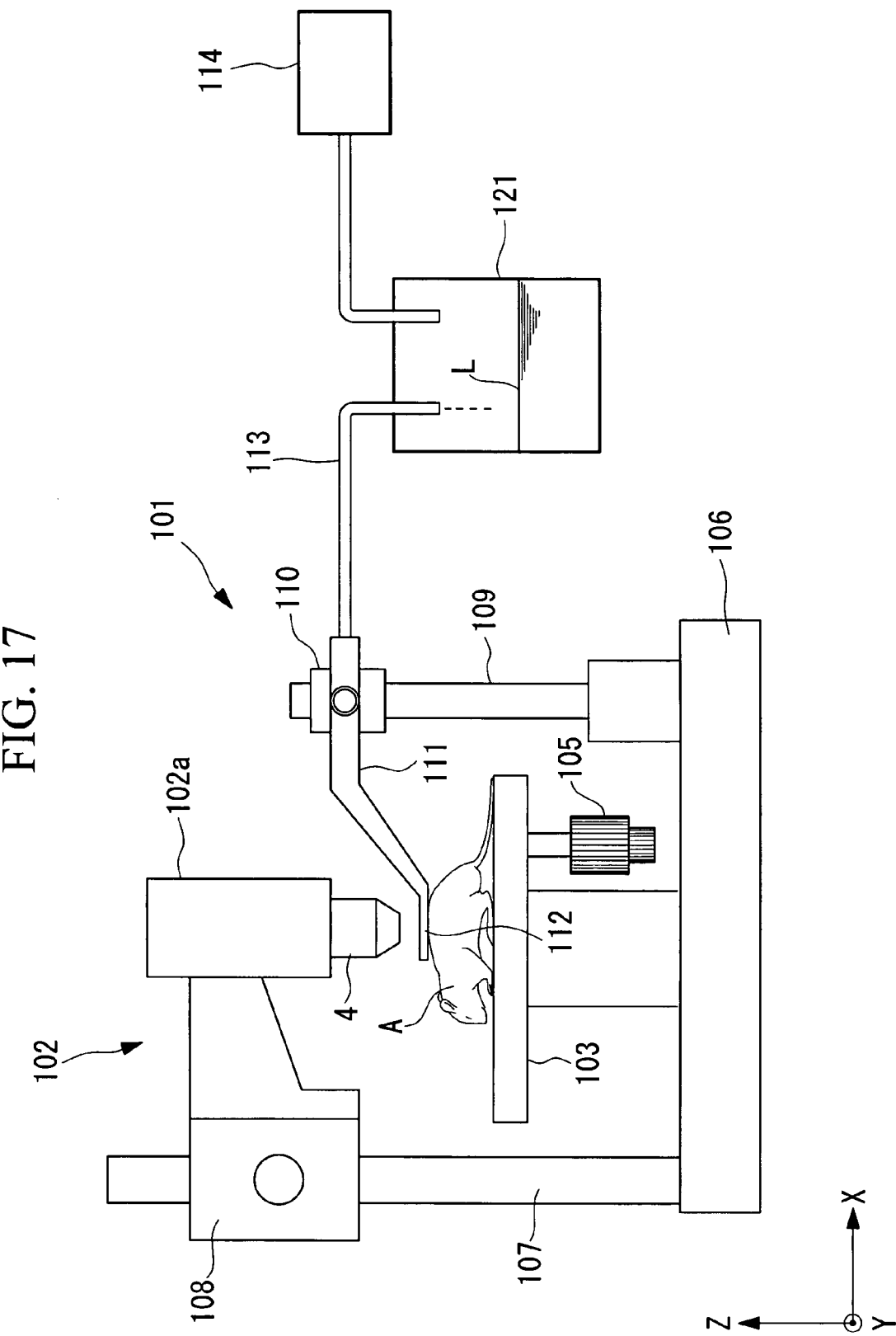
FIG. 17 is a view showing the overall structure of a modification of the stabilizer for in vivo examination shown in FIG. 10.

In the description of this embodiment, the suction pump 114 and the suction hole 117 of the arm 111 are connected with the tube 113. Alternatively, as shown in FIG. 17, a reservoir 121 in which the pressure is reduced with the suction pump 114 may be provided between the arm 111 and the suction pump 114. According to this structure, as the pressure in the reservoir 121 is reduced to a negative pressure, the pressure in the tube 113, the suction hole 117, and the recess 116 is also reduced. When a liquid L, such as blood, is sucked from the specimen A side, the sucked liquid L can be held in the reservoir 121 without returning to the suction pump 114.

In the description of this embodiment, the stabilizer for in vivo examination 101 is attached to the supporting column 109 provided near the microscope examination unit 102, but the position of the stabilizer for in vivo examination 101 is not limited to this. In either the case where the stabilizer for in vivo examination 101 is attached to a main unit 102a of the microscope examination unit 102 or the case where the stabilizer for in vivo examination 101 is attached to the objective unit 104 of the microscope examination unit 102, the same advantages can be achieved.

The tip 112 of the stabilizer for in vivo examination 101 may be made of any material, but is preferably made of a transparent material. In such a case, the state of the specimen A pressed by the tip 112 can be examined through the tip 112. For example, bleeding in the specimen A can be detected early, allowing the problem to be dealt with.

What is claimed is:

1. A stabilizer for in vivo examination that is placed in contact with a biological specimen during examination of the specimen to suppress movement thereof, the stabilizer comprising:
    a contact portion provided around an observation area, the contact portion configured to be brought into contact with the biological specimen;
    a recess provided in the contact portion, the recess defining a small space together with the surface of the biological specimen; and,
    a pressure-reducing device, connected to the recess, the pressure-reducing device configured to reduce the pressure in the small space,
    wherein a through-hole member having a plurality of continuous pores is provided in the recess, and
    wherein the biological specimen sealing off an opening of the recess is sucked onto the contact portion via the continuous pores of the through-hole member.

2. The stabilizer for in vivo examination according to claim 1, wherein the through-hole member is provided in the recess in such a manner so as to be replaceable.

3. The stabilizer for in vivo examination according to claim 1,
    wherein the contact portion has a ring shape having a central through hole, and
    the recess is a ring-shaped groove provided so as to surround the central through hole of the contact portion around the entire circumference thereof.

4. The stabilizer for in vivo examination according to claim 1, wherein the pressure-reducing device is a suction pump.

* * * * *